United States Patent [19]

De Amorim

[11] Patent Number: 4,836,635
[45] Date of Patent: Jun. 6, 1989

[54] ACTIVE BASE FOR AN OPTICAL CONNECTOR

[75] Inventor: Lionel De Amorim, Lannion, France
[73] Assignee: Alcate Cit, Paris, France
[21] Appl. No.: 159,999
[22] Filed: Feb. 24, 1988
[30] Foreign Application Priority Data Feb. 26, 1987 [FR] France .............................. 87 02558

[51] Int. Cl.⁴ .............................................. G02B 6/42
[52] U.S. Cl. ................................ 350/96.20; 250/227; 350/96.18; 357/74
[58] Field of Search ............... 350/96.15, 96.20, 96.18, 350/96.21; 250/227; 357/17, 19, 30 M, 30 L, 72, 74, 79

[56] References Cited

U.S. PATENT DOCUMENTS

| 4,060,309 | 11/1977 | Le Noane et al. | 350/96.2 |
| 4,204,743 | 5/1980 | Etaix | 350/96.20 |
| 4,307,934 | 12/1981 | Palmer | 350/96.2 |

FOREIGN PATENT DOCUMENTS

| 0035673 | 9/1981 | European Pat. Off. | 350/96.2 |
| 0201749 | 11/1986 | European Pat. Off. | 350/96.2 |
| 2584828 | 1/1987 | France | 350/96.15 |
| 58-35507 | 3/1983 | Japan | 350/96.20 |
| 58-127905 | 7/1983 | Japan | 350/96.20 |
| 58-169036 | 10/1983 | Japan | 350/96.20 |
| 2015766 | 9/1979 | United Kingdom | 350/96.2 |

OTHER PUBLICATIONS

Research Disclosure, Mar. 1979, No. 17910, Industrial Opportunities Ltd., Vant., Hants, GB; "Connection of a Photo-Electric Component and a Light Pipe".
Patent Abstracts of Japan, vol. 8, No. 129 (p. 280) (1566), Jun. 15, 1984; & JP-A-59 413 (Matsushita Denki Sangyo K.K.), 02/23/1984.

Primary Examiner—William L. Sikes
Assistant Examiner—Frank González
Attorney, Agent, or Firm—Sughrue, Mion, Zinn, Macpeak & Seas

[57] ABSTRACT

The active base comprises a body (10) having a cylindrical hole (12) in which an optical module (13) is inserted, said module being constituted by a socket (22) about an axis XX', a hollow cylindrical support (26) having a bottom including a hole, a diode (25) mounted in the support, with the diode package having a flange (251) that bears against the bottom of the support. The hole through the support has a diameter which is greater than the diameter of the package to enable the diode to be positioned on the axis XX'. A spring ring (28) is inserted in the support after the diode has been positioned. When the diode is suitable for emitting or receiving a convergent light beam, the socket includes a centering ring (24) disposed ahead of the diode and containing a rod lens (23) in the middle thereof.

8 Claims, 3 Drawing Sheets

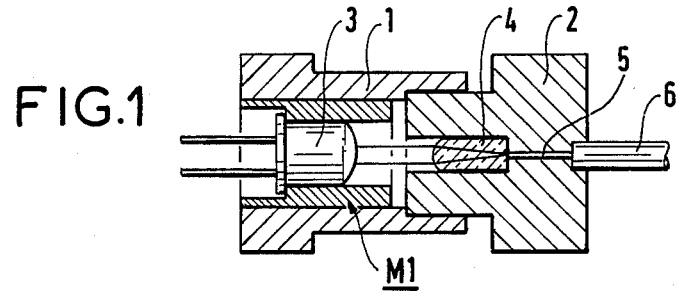
FIG.1
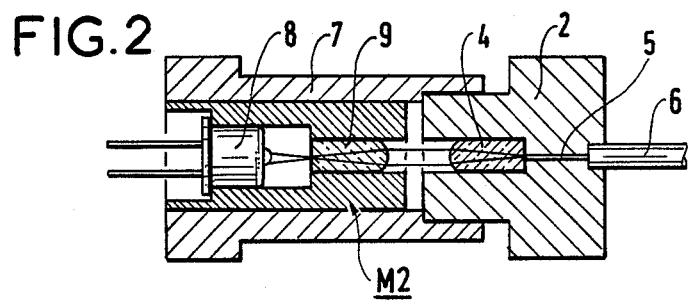
FIG.2
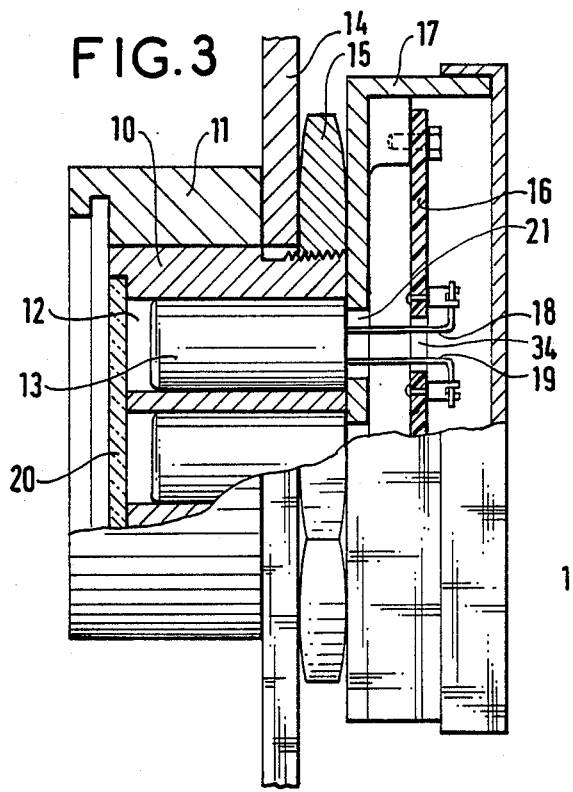
FIG.3
FIG.4
FIG.5

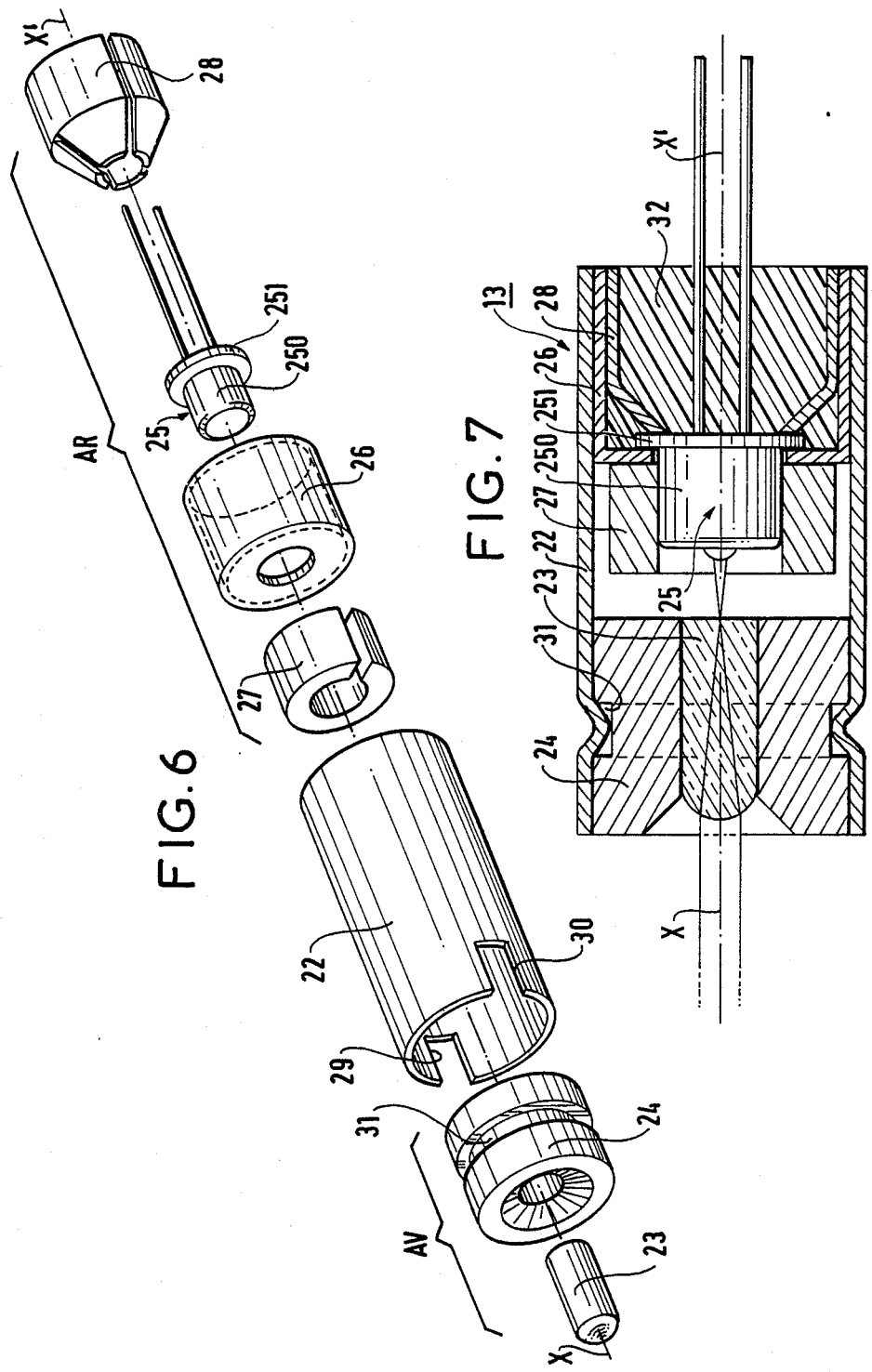

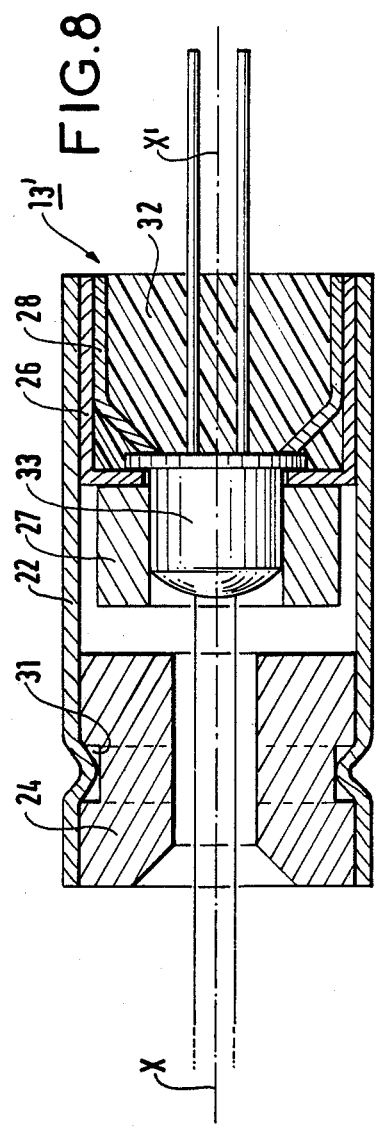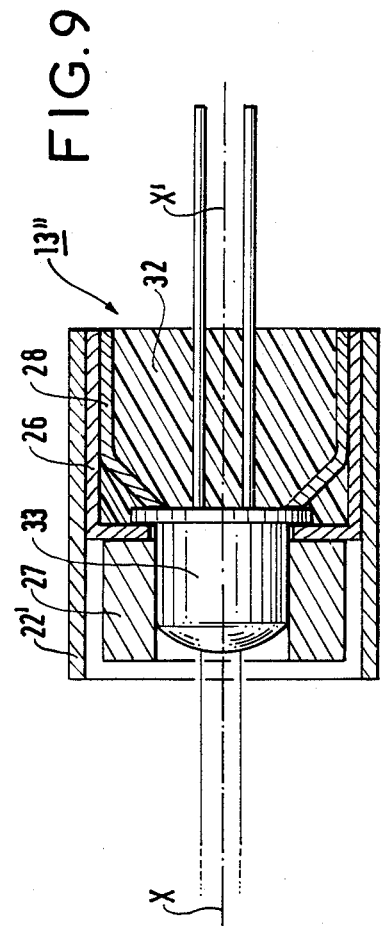

ACTIVE BASE FOR AN OPTICAL CONNECTOR

The invention relates to a connector, in particular a connector for use outdoors, i.e. under the open sky, and in particular to a connector base for mounting on a front face of an electronic apparatus and which is generally required to be waterproof, with the base being intended to receive a plug connected to optical fibers; connectors are intended for interconnecting electrnic apparatuses, which may be relatively close or relatively far apart.

BACKGROUND OF THE INVENTION

The connector bases currently in use under such conditions are passive bases, i.e. they do not include an opto-electronic component.

The front portion of a passive base mounted on a panel of an electronic apparatus receives a plug; the rear portion is connected inside the electronic apparatus to one or two optical fibers with each optical fiber being devoted to a particular direction of transmission. Each fiber has an optical plug at its other end for connection to an active (transmission or reception) base, which base is equipped with a light-emitting diode if it is a transmission base or with a light-receiving diode if it is a receiving base. Such active bases are, naturally, fixed on or close to an electronic circuit, e.g. a printed circuit card, with the light-emitting or light-receiving diode being connected to said electronic circuit.

This type of connection suffers from several drawbacks:
- a connection between two electronic circuits belonging to two different apparatuses has several coupling points;
- if a light-emitting or light-receiving diode fails, the base fitted with the faulty diode must be replaced in the corresponding apparatus since the diode itself is not dismountable; and
- the presence of optical fibers between a passive base and the electronic circuits within an electronic apparatus can give rise to problems of space occupation, in particular for receiving optical fibers which have relatively large minimum possible radiuses of curvature and which must be provided with a certain amount of spare length; the reliability of the apparatuses and thus of a connection, and the lifetime of optical fibers in a apparatus are thus compromised when the available space is limited, even though the apparatus is not as compact as it could be if it had no optical fibers.

French Pat. No. 2 440 009 describes a base and a receiving end-fitting body equipped with a photodiode, said receiving end-fitting being fixed on one end of the base by two screws which pass through two holes provided in the body of the receiving end-fitting with considerable play, the base including two tapped holes for receiving said screws. The base receives a plug provided with an end-fitting having the end of an optical fiber fixed at the end of the fitting, and the receiving end-fitting body is moved until the best possible transmission is obtained between the optical fiber and the photodiode window, after which said screws are tightened in order to lock the receiving end-fitting in said position.

With this type of base, replacing a defective photodiode requires the base to be disassembled together with the receiving end-fitting; for example, if the defective receiving end fitting is replaced by a new receiving end-fitting, the new receiving end-fitting needs to be positioned and such positioning is generally performed by micromanipulation, which is practically impossible to perform on-site, since a user does not normally have the necessary equipment. It is therefore necessary to provide the base assembly with a spare receiving end-fitting, thereby avoiding the positioning problem but nevertheless requiring the faulty receiving end-fitting base assembly to be disassembled and the spare assembly to be assembled.

Preferred embodiments of the present invention remedy the drawbacks of currently used connectors, and in particular reduce the number of coupling points in an optical link, avoid having optical fibers in an apparatus so as to reduce the space it occupies, and enable faulty light-emitting or light-receiving diodes to be easily replaced.

SUMMARY OF THE INVENTION

The present invention provides an active connector base for co-operating with a plug having an optical fiber, said base comprising a body having a cylindrical hole in which an optical module is inserted, said module being constituted by a socket about an axis XX' with a cylindrical support fitted with a light-emitting or a light-receiving diode encapsulated in a package having a flange being received as a tight fit in one end of the socket, the base including the improvements whereby:
- said cylindrical support is a hollow support having a bottom with a hole whose diameter is greater than the diameter of the package whose flange is pressed against said bottom inside the support,
- the support and the package constitute an assembly received inside the socket,
- said hole through the hollow support allows the package to be moved perpendicularly to the axis XX' of the socket in order to position the diode on said axis XX', and
- after the diode has been positioned, the package is kept in position by retention means inserted in the support, said diode positioning being performed during manufacture of the optical module.

Light-emitting diodes (LEDs) such as electroluminescent diodes, and light-receiving diodes such as PIN photodiodes are sold in two different types: in a first type the light-receiving or the light-emitting diode operates with a parallel beam whereas in the second type the light-receiving or light-emitting diode operates with a convergent beam.

A light-emitting diode of the second type emits a light beam which is initially convergent, and light-receiving diode of the second type receives a light beam which diverges from a focus point situated in front of the diode. The term "convergent type" is used both for emitted light beams and for received light beams to distinguish them from light beams which are of the parallel type.

An active optical module in accordance with the invention may be fitted with a diode of the first type or of the second type, and a base in accordance with the invention may be fitted with one or more active optical modules, regardless of the type of diode that is fitted to an active optical module.

Regardless of their type, diodes are generally sold in the form of TO5 or TO18 type packages, but naturally other packages could be used in an optical module in accordance with the invention.

Regardless of the type of diode fitted to an active module, and thus to a base, the connector plug remains the same.

BRIEF DESCRIPTION OF THE DRAWINGS

Embodiments of the invention are described by way of example with reference to the accompanying drawings, in which:

FIG. 1 is a diagram of a connector comprising a base having an optical module in accordance with the invention, said optical module being equipped with a diode of the first type;

FIG. 2 is a diagram of a connector including a base with an optical module in accordance with the invention, said optical module being fitted with a diode of the second type;

FIG. 3 is a fragmentary section through a base in accordance with the invention and mounted on an electronic apparatus;

FIG. 4 is a front view of a first body for the FIG. 3 base;

FIG. 5 is a front view of a variant body for the FIG. 3 base;

FIG. 6 is an exploded perspective view of the FIG. 3 optical module;

FIG. 7 is a longitudinal section through the FIG. 6 optical module;

FIG. 8 is a longitudinal section through a variant of the FIG. 7 optical module; and FIG. 9 is a longitudinal section through another variant of the FIG. 7 optical module.

MORE DETAILED DESCRIPTION

In FIG. 1, the connector comprises a base 1 and a plug 2. The base 1 includes an optical module M1 fitted with a diode 3 which is electrically connected to an electronic circuit, not shown. The diode 3 is of a first type, i.e. it emits or receives a parallel type light beam. The plug 2 comprises a rod lens 4 connected to the end of an optical fiber 5 and transmitting a parallel light beam to or from the diode 3. Reference 6 designates the sheathed portion of an optical fiber 5.

In FIG. 2, the connector comprises a base 7 associated with a plug 2 which is identical to that shown in FIG. 1. The base 7 includes an optical module M2 fitted with a diode 8 which is likewise electrically connected to an electronic circuit, not shown. The diode 8 is of a second type, i.e. it emits or receives convergent light beams. The module M2 also includes a rod lens 9 such that the light beam between the rod lenses 9 and 4 is of the parallel type.

In FIGS. 1 and 2, the diodes 3 and 8 are naturally either light-emitting or else light-receiving diodes, and this has no effect on the light beam between the optical fiber 5 and the diode 3 or 8 other than the direction of light propagation.

In both figures, the light beam entering or leaving the base and thus the optical module is of the parallel type, such that the plug 2 is identical in both figures and independent of the type of diode, i.e. the plug is independent of whether the diode emits or receives a parallel beam or a convergent beam. As a result the system is an afocal system which requires less accuracy in longitudinal positioning between the base and the plug.

FIG. 3 is a fragmentary section through a base in accordance with the invention mounted on an electronic apparatus. The base comprises a body 10 mounted in an envelope 11. The body 10 has cylindrical holes 12, e.g. two holes as shown in FIG. 4 which is a front view of the body 10. FIG. 5 shows a variant base body in which the base, reference 10', has four holes. Each hole 12 receives a cylindrically-shaped optical module 13 in accordance with the invention. Each optical module is a push fit in the hole 12 to ensure that its axis coincides with the axis of the hole.

The base is mounted on a front face of a panel 14 of the electronic apparatus, and is fixed, for example, by means of a nut 15. In the electronic apparatus, a printed circuit card 16 is mounted on a support plate 17. The body 10 of the base comes up against the support plate 17. The optical module 13 also comes into abutment against the support plate 17, at the periphery of a hole 21 in said plate level with the module. The optical module comprises an LED or a PIN diode, and the connection tabs 18 and 19 of the diode pass through the hole 21 and a hole 34 provided for the purpose in the card 16, and are connected, e.g. by soldering, to the printed circuit on the card 16. The tabs 18 and 19 may alternatively be connected to the printed circuit by means of a miniature connector suitable for keeping the length of the connections down to a minimum.

The front face of the body 10 has a porthole 20 with parallel faces and mounted in watertight manner on the body. This transparent porthole protects the optical modules and is easily cleaned.

The porthole is also dismountable, thereby enabling it to be replaced if broken. Said module, prior to being disconnected from the printed circuit is extracted via the front face of the body, with the holes 21 and 34 allowing a tool to pass for applying pressure to the module to assist in said extraction, and the replacement module is then inserted, likewise from the front face of the body 10 in place of the defective module, in the corresponding cylindrical hole 12, and is then connected to the printed circuit of the card 16. There is therefore no need to dismount the base from the panel 14 when replacing a defective optical module.

FIG. 6 is an exploded perspective view of an optical module 13 in accordance with the invention, and FIG. 7 shows the assembled optical module in longitudinal section. The optical module comprises a socket 22 which is a cylindrical tube about an axis XX', surrounding a rod lens 23 mounted in a centering ring 24, a diode 25 having a support 26, with the electrical connection tabs of the diode 25 projecting beyond the socket 22, a radiator 27, and a spring ring 28. The diode is of the second type, i.e. it emits or receives a convergent light beam and it may be an LED or a PIN diode. Apart from the rod lens 23, all of the parts are made of metal. The diode 25, the diode support 26, the radiator 27, and the spring ring 28 constitute the rear portion AR of the equipment inside the socket 22, and the assembly constituted by the rod lens 23 and the centering ring 24 constitutes the front portion AV.

The diode 25 is in a package, e.g. a TO18 or TO5 package, having a cylindrical body 250 terminated by a flange 251 at its end furthest from the optical access to the diode. The support 26 is in the form of a hollow cylinder which is open at one of its ends and which is closed at its other end by a bottom having a hole therethrough whose diameter is greater than the diameter of the cylindrical body 250 of the diode 25 and less than the diameter of the flange 251 on the diode.

The support 26 is a tight fit in the socket 22 and its bottom is directed towards the front portion AV. The diode 25 is inserted via the inside of the support 26 and passes through the bottom of the support with a degree of clearance so as to project therebeyond, while its flange bears against the bottom of the support, with the clearance between the cylindrical body of the diode 25 and the bottom of the support 26 enabling the diode 25 to be centered on the axis XX' of the socket, which axis is also the geometrical axis of the optical module. The radiator 27 is a cylindrical part having a longitudinal slot, and it is mounted on the diode outside the support 26. In addition to dissipating heat, the radiator serves to maintain the diode in position, i.e. against the support 26.

The centering ring 24 together with the rod lens 23 which is glued inside it are mounted inside the socket 22 with the axis of the rod lens coinciding with the axis of the socket and the diode is then micromanipulated on a test bench in order to align the diode chip, i.e. the active part of the diode, on the active XX' of the socket so that the axis of the optical module coincides with the axis XX' of the socket.

If the diode is a light-receiving diode, this adjustment is performed by applying a parallel light beam to the module with the optical axis of the light beam coinciding with the axis XX' of the socket 22, and then measuring the electrical power output from the diode so as to determine the position in which the diode gives maximum power. If the diode is an LED, the adjustment is performed by electrically exciting the diode and measuring the optical power picked up at the outlet from the module on the axis XX' of the socket so as to identify the position of the diode which gives maximum power. Once the adjustment has been performed, the spring ring 28 is put into place, said ring being generally cylindrical in shape and having a tapering end split into four sectors by slots, with one of the slots extending over the entire length of the ring. The ring is mounted inside the support 26 and its tapering end presses the flange of the diode against the support. The assembly is then finally locked into place by casting a resin 32 inside the spring ring 28.

The centering ring 24 is a loose fit inside the socket so as to enable the longitudinal coupling between the rod lens 23 and the diode 25 to be optimized. Two notches 29 and 30 in the socket 22 enable the centering ring to be displaced so that this adjustment can be performed. Once adjustment has been terminated, the centering ring 24 is locked into place by crimping the socket, at three points for example, around a groove 31 in the centering ring.

The optical module may be fitted with a diode in a package of any shape other than that described with reference to FIGS. 6 and 7, providing a suitable support is used. By way of example, the optical module may be 20 mm long and 10 mm long in diameter.

The invention can thus provide modules having different light-emitting powers, and different wavelengths depending on the characteristics of the diodes used. Also, the bases are not specialized from the optical point of view since their characteristics depend on the optical modules used therein. The invention makes it possible to provide a single base having a body such as that shown in FIG. 5, for example, and including two light-emission paths with different characteristics concerning power or wavelength, together with two different light-reception paths, and in order to change the characteristics of any one of the paths (a light-emitting path or a light-receiving path) only the corresponding optical module needs to be changed.

FIG. 8 is a longitudinal section through a variant of the FIG. 7 optical module. In the module of this variant which is referenced 13', the diode 33 is of the first type, i.e. its light beam is parallel. As shown in FIG. 1, the base does not have a rod lens in this case. In the FIG. 8 optical module, the centering ring 24 does not have a rod lens, but otherwise the optical module is identical to that shown in FIG. 7, and the active portion of the diode is aligned on the axis XX' of the socket 22 of the optical module.

FIG. 9 is a longitudinal section through an optical module referenced 13'', which is a variant of the optical module 13' shown in FIG. 8.

In FIG. 9, the diode 33 is of the first type, and the FIG. 8 centering ring 28 has been omitted, such that the length of the socket, referenced 22' in this case, and thus of the optical module is shorter than the length of the FIG. 8 socket 22.

It is thus possible, when using diodes of the first type to bases having shorter bodies, however a FIG. 9 optical module cannot be replaced by an optical module as shown in FIG. 7 or FIG. 8. In contrast, a body intended to be equipped with optical module as shown in FIGS. 7 or 8 may be equipped with modules as shown in FIG. 9.

The plugs as shown in FIGS. 1 and 2 which co-operate with the bases are of conventional type. Naturally, each rod lens in a plug must be disposed opposite an optical module in a base having a body as shown in FIG. 4 or FIG. 5 or having some other type of body, with the axis of the rod lens and the optical axis of the parallel light beam as emitted or received coinciding. When the plug is mounted on the base, the axis of the hole 12 coincides with the axis of the rod lens in the plug. The body of the base is mounted by any known means inside the envelope which includes means for fastening and locking a plug of any known type, said means not forming a part of the invention.

When an optical module is a light-receiving module, the axis of the parallel light beam it receives from the plug coincides with the axis of the hole 12 and the optical module is mounted without slack in said hole, as a result the axis of the socket 22 and thus the axis of the optical module coincides with the optical axis of the received light beam, regardless of whether the optical module includes a rod lens. As when mounting the optical module, the active portion of the diode is aligned on the axis XX' of the socket. This active portion of the diode is then automatically aligned on the optical axis of the light beam received from the plug such that replacing a light-receiving optical module does not require an alignment operation.

When an optical module is a light-emitting module, and regardless of whether it includes a rod lens, the operation of obtaining alignment on the axis XX' of the socket merely consists in causing the axis of the parallel light beam emerging from the optical module to coincide with the axis XX' such that replacing a light-emitting optical module does not require any alignment operation since the axis XX' coincides with the axis of the hole 12 and this axis coincides with the axis of the rod lens in the plug.

The base and in particular the body thereof may be made in any of the materials commonly used for connectors. These materials are metal or plastic. Since bases in accordance with the invention are used to interconnect electronic apparatuses, they are intended to be mounted on the outside of such apparatuses on a panel thereof. When such apparatuses are disposed indoors, plastic materials may be used, however, when such apparatuses are used outdoors, i.e. under the open sky, and over a severe range of climatic conditions, e.g. between −40° C. and +55° C., it is preferable to use metals, optionally treated for protection against corrosion, in particular in hot and humid atmospheres, both for the body and for the envelope of a base, with the dimensions of the base being adapted to its conditions of use so as to ensure that the base has sufficient mechanical strength to withstand shock and vibration. The plug must have similar strength so as to provide a "ruggedized" connector.

Naturally, an active base in accordance with the invention need include only one optical module. In this case the body of the base has only one hole and the base is suitable for a one-way connection between an emitting apparatus and a receiving apparatus.

I claim:

1. An active connector base for engagement with a plug having an optical fiber, said base comprising a body having a cylindrical hole, an optical module inserted within said hole as a unit, said module being removable from said hole as a unit and being constituted by a socket having a longitudinal axis XX', a cylindrical support fitted with one of a light-emitting and light-receiving diode encapsulated in a package having a flange, said cylindrical socket being tight fitted in one end of the socket, the improvement wherein:
   said cylindrical support is a hollow support having a bottom with a hole, the diameter of said hole being greater then the diameter of the package and said flange being pressed against said bottom, inside the support,
   the support and the package constituting an assembly set inside the socket,
   said hole through the hollow support allowing the package to be moved perpendicularly to the axis XX' of the socket in order to position the diode on said axis XX', and
   holding means for keeping said package in position after the diode has been positioned by insertion in the support, allowing said diode positioning to be performed during manufacture of the optical module.

2. A connector according to claim 1, wherein the body includes at least two cylindrical holes each having an optical module received therein, and said base operatively engaging a plug having a respective optical fiber for each optical module in the base.

3. A base according to claim 1, wherein said holding means are constituted by a spring ring inserted inside the support and pressing said flange of the package against the bottom of the support.

4. A base according to claim 3, wherein a resin is cast in the spring ring.

5. A base according to claim 1, wherein a cylindrical radiator having a longitudinal slot is mounted on the cylindrical body of the diode package.

6. A base according to claim 1, wherein the diode of at least one of the optical modules is of the type emitting or receiving a parallel light beam.

7. A base according to claim 1, wherein the diode of at least one optical module is of the the type emitting or receiving a convergent light beam, wherein the optical module socket includes a centering ring ahead of the diode, a rod lens is provided in the center of the centering ring having an axis coinciding with the socket axis XX', said ring and said rod lens constituting an assembly received inside the socket, and wherein said socket is crimped to fix said centering ring with the rods lens longitudinally positioned relative to the diode, said rod lens emitting or receiving a parallel light beam about an axis coinciding with the socket axis XX' via a face furthest from the diode, with positioning of the rod lens being effected during manufacture of the optical module.

8. A base according to claim 1 wherein the body includes a removable window, having parallel faces and disposed at a front end of the base looking at the plug.

* * * * *